United States Patent
Wahl et al.

[11] 3,759,232
[45] Sept. 18, 1973

[54] METHOD AND APPARATUS TO REMOVE POLLUTING COMPONENTS FROM THE EXHAUST GASES OF INTERNAL COMBUSTION ENGINES

[75] Inventors: Josef Wahl, Stuttgart; Peter Jürgen Schmidt, Schwieberdingen, both of Germany

[73] Assignee: Robert Bosch GmbH, Gerlingen-Schillerhohe, Germany

[22] Filed: June 23, 1972

[21] Appl. No.: 265,547

[30] Foreign Application Priority Data
Jan. 29, 1972 Germany.................. P 22 04 192.5

[52] U.S. Cl. ..... 123/32 EA, 123/32 AE, 123/119 D, 123/119 DB, 123/32 R, 60/274, 60/276, 60/285
[51] Int. Cl. ........................ F02b 3/00, F02m 37/00
[58] Field of Search .................... 123/32 EA, 139 F, 123/32 AE; 60/285

[56] References Cited
UNITED STATES PATENTS
3,601,108  8/1971  Nambu ............................... 123/119
3,698,371  10/1972  Mitsuyama......................... 123/119

FOREIGN PATENTS OR APPLICATIONS
600,895  4/1948  Great Britain........................ 123/32

*Primary Examiner*—Laurence M. Goodridge
*Assistant Examiner*—Ronald B. Cox
*Attorney*—Flynn & Frishauf

[57] ABSTRACT

Air and fuel are applied to the inlet manifold of an internal combustion engine over a first path, the amount of air being controlled in accordance with a command input, for example to control operation of the engine. The oxygen content in the exhaust gases is measured and additional air is applied to the inlet manifold of the engine over a second path, the amount of additional air being supplied over the second path being controlled in accordance with (a) the amount of air admitted through the first path and, additionally, (b) in accordance with the measured oxygen content of the exhaust gases.

45 Claims, 13 Drawing Figures

METHOD AND APPARATUS TO REMOVE POLLUTING COMPONENTS FROM THE EXHAUST GASES OF INTERNAL COMBUSTION ENGINES

The present invention relates to a method of removing polluting components from the exhaust gases of internal combustion engines, and to an internal combustion engine exhaust emission control system, the invention being particularly applicable to internal combustion engines of automotive vehicles.

Various methods and systems have been proposed in order to decrease the amount of polluting components in the exhaust of internal combustion engines, and particularly in automotive-type internal combustion engines. The oxygen content of the exhaust gases are measured by means of an oxygen sensing device. Such an oxygen sensing device may be formed of a solid electrolyte, preferably zirconium dioxide, which is conductive for oxygen ions. The output signal of the oxygen sensor then is applied to a control amplifier to determine the position of a bypass valve which controls additional air being applied to the internal combustion engine. If insufficient oxygen is present in the exhaust gases, indicating that the mixture is too rich, additional air is provided by the bypass valve to provide a somewhat leaner air-fuel mixture to the engine.

Reference in the specification will be made to the air number, denoted lambda ($\lambda$). This air number $\lambda$ is a measure of the composition of the air-fuel mixture. The number $\lambda$ is proportional to the mass of air and fuel, and the value of this number $\lambda$ is one ($\lambda = 1.0$) if a stoichiometric mixture is present. Under stoichiometric conditions, the mixture has such a composition that, in view of the chemical reactions, all hydrocarbons in the fuel can theoretically combine with the oxygen in the air to provide complete combustion to carbon dioxide and water. In actual practice, even with a stoichiometric mixture, unburned non-combusted hydrocarbons and carbon monoxide are contained in the exhaust gases.

Processes previously proposed influence the position of a bypass valve in accordance with the output of the oxygen sensing device without, however, considering the relative changes of the composition of the air-fuel mixture when the amount of air passing through the main air duct to the engine is high. For example, when the throttle valve of an automotive-type internal combustion engine is wide open, the relative change in the air number $\lambda$ is not influenced nearly as much by change in the position of a bypass throttle, than when the amount of air passing through the main air path is low. The composition of the air-fuel mixture can be controlled with respect to all positions of the throttle to a predetermined value since the control loop, including the oxygen sensor, can completely close or completely open the bypass valve, the control loop itself including the oxygen sensor being a closed loop. If the amount of air passing through the main air path is large, then the time lag between correct balance of the air-fuel mixture and sensing of deviation from a desired level may be substantial since relative changes in the air-fuel mixture — as above referred to by control of the throttle valve alone then become small.

It is an object of the present invention to improve the control of the exhaust emission gases of internal combustion engines and particularly to decrease the delay time of the closed control loop by making the response time of the control loop dependent on the amount of air being passed through the intake manifold over the direct air path.

SUBJECT MATTER OF THE PRESENT INVENTION

Briefly, the base position of a bypass valve is made dependent on the throttle position of the main air path, that is, of the main control throttle, the additional change of the bypass valve being controlled in dependence on sensed oxygen component of the exhaust gases.

By considering the change to be made in the bypass air not only based alone on the sensed oxygen in the exhaust, but also based on the air flow to the engine, sudden increases in air flow to the engine will cause the simultaneous increase in air flow of the bypass valve. Any still necessary corrections can then be carried out by a control amplifier in a substantially shorter period of time than would be required if the base position of the bypass valve were controlled only from the oxygen sensor alone. The position of the main throttle valve influences the rotational speed of the internal combustion engine which, in turn, influences the air flow through the intake manifold. This interaction can, in accordance with the embodiment of the invention, be considered by making the base position of the bypass valve dependent on the position of the main throttle which controls the speed of the internal combustion engine.

Relative changes of the composition of the air-fuel mixture can be matched closely to relative changes of the output voltage of the oxygen sensor if, in accordance with a further feature of the invention, the control amplitude of the control amplifier which determines the position of an auxiliary throttle controlling bypass air operates in dependence on the throttle position of the main throttle and further of the speed of the internal combustion engine. By thus controlling the control signal level, the control loop will respond with even less delay.

The invention will be described by way of example with reference to the accompanying drawings, wherein:

FIG. 2b is a schematic representation of a control loop for use in the system of FIG. 2a;

FIG. 4b is a graph illustrating operation of the sensor of FIG. 4a;

FIGS. 6 to 8 are cross-sectional views of different types of bypass valves, and their control, in which FIG. 8b is a detail of the valve of FIG. 8a;

Figure 1:
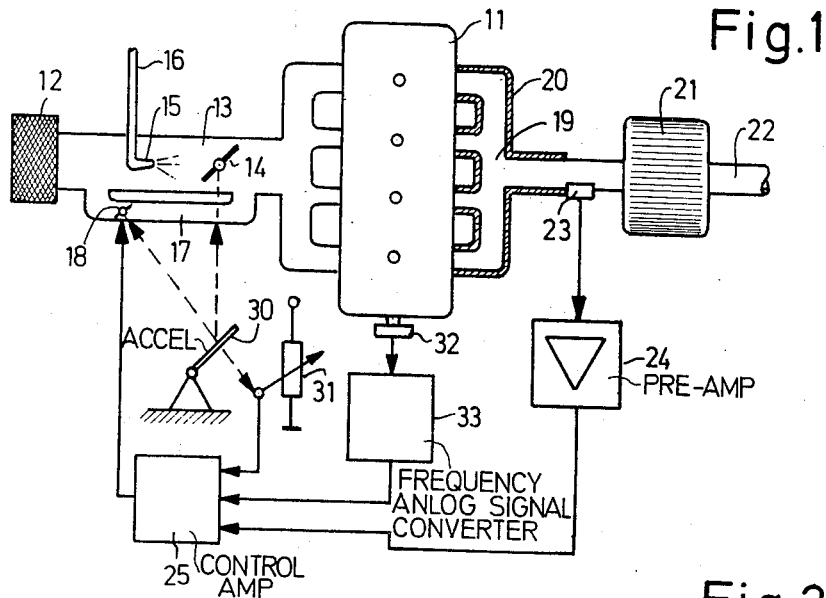
FIG. 1 is a highly schematic representation of an internal combustion engine having a control loop in accordance with the present invention.

The internal combustion engine 11, shown for purposes of this application as a four-cylinder engine, although it may be any type of internal combustion engine, and not restricted to a reciprocating-type internal combustion engine, has intake air delivered over an air filter 12 connected to an intake duct 13. Throttle 14 is movably located within duct 13, the throttle being operated from a control pedal 30. The nozzle 15, shown schematically only, of a carburetor delivers fuel from fuel supply 16.

Filtered air is additionally supplied to the internal combustion engine over a bypass duct 17, which bridges the carburetor nozzle 15. In the embodiment shown, the bypass air is taken through the air filter 12, then branches off from inlet duct 13 and terminates behind throttle 14 at the engine side of duct 13. The amount of air passing through the bypass 17 can be controlled by means of a bypass valve 18. Bypass valve 18 is electrically controlled, and is connected to the output of a control amplifier 25. Bypass valve 18 may, additionally, be set mechanically by connection from the accelerator pedal 30, as schematically indicated by the dashed line in FIG. 1.

The exhaust from the internal combustion engine 11 is connected to a manifold 19, the wall 20 of which is thermally insulated with respect to surrounding air. The manifold 19 terminates in a catalytic reactor 21 and the output from the catalytic reactor is then connected to an exhaust pipe, muffler, and the like, conjointly schematically indicated at 22.

An oxygen sensing element 23 is located in the wall 20 of the exhaust manifold 19, or its exhaust duct. The electrical output of the oxygen sensor 23 is connected to a pre-amplifier 24 and, after amplification, to one input of the control amplifier 25. The shaft of the internal combustion engine drives a tachometer generator which, for example, may consist of a series connection of a pulse source 32 and a frequency responsive direct current output converter circuit 33, operating as a digital-analog converter and converting the output of pulse source 32 which has a frequency representative of engine speed into a direct current voltage likewise representative of engine speed. The outlt of converter 33 is connected to a second input of the control amplifier 25.

The accelerator or control pedal 30 is further connected to a position-current transducer 31 which may, in its simplest form, be merely a potentiometer connected with one terminal to a source of reference voltage and on the other to chassis, so that upon change of the position of pedal 30, the tap point of the potentiometer will likewise change. The output voltage of the position transducer 31 is proportional to the deflection angle of the pedal 30, and connected to a third input of control amplifier 25.

Figure 2A:
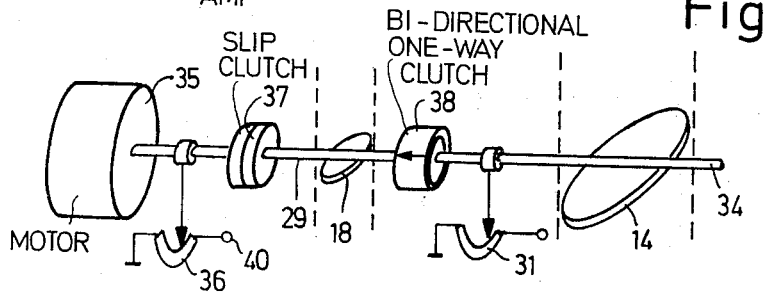
FIG. 2a is a schematic representation of one embodiment of a control system for a bypass valve.

The mechanical arrangement to control the bypass valve 18 is illustrated, highly schematically, in FIG. 2a. The throttle 14 is secured to a throttle shaft 34; the throttle shaft 34 additionally drives the movable contact of a potentiometer 31, the output terminals of which are connected between a reference source and chassis. A positioning motor 35 is connected to a slip coupling 37 of a bypass valve shaft 29 which carries the bypass throttle disk 18. Potentiometer 36, connected between a reference source, indicated as terminal 40 and chassis provides an output signal representative of the angular deflection of motor 35. A bi-directional one-way clutch, in the form of a free-wheeling clutch 38 interconnects the bypass valve shaft 29 and the throttle valve shaft 34. Clutch 38 is so arranged that it transfers movement of the throttle valve shaft 34 to the bypass valve shaft 29 — in both rotary directions — but blocks any feedback of movement from the shaft 29 to the throttle shaft 34.

Figure 2B:
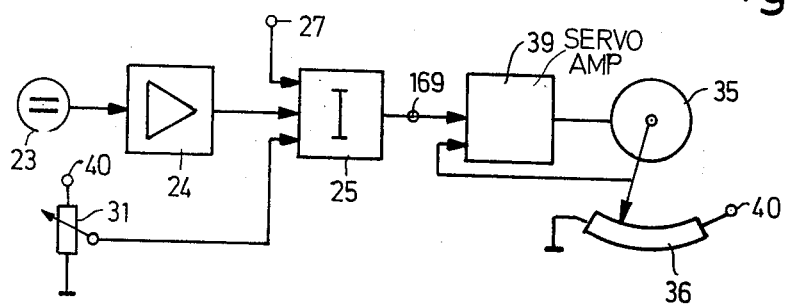

The circuit according to FIG. 2 has the elements 23, 24, 25 and 31 connected in the same way as in the schematic representation of FIG. 1. The control amplifier 25, however, is somewhat simpler, in that it does not have an input to connect an electrical representation of engine speed, that is, the output from the frequency-analog converter 33 is not required. A second input 27 of control amplifier 25 is used to introduce a command value representative of the air number λ, that is, the proportion of the air and fuel mixture. Control amplifier 25 is connected to a servo amplifier 39, providing an output voltage to operate the positioning motor 35, and having error input connected to the tap point of the positioning potentiometer 36, as well known in servo technology.

Figure 3:
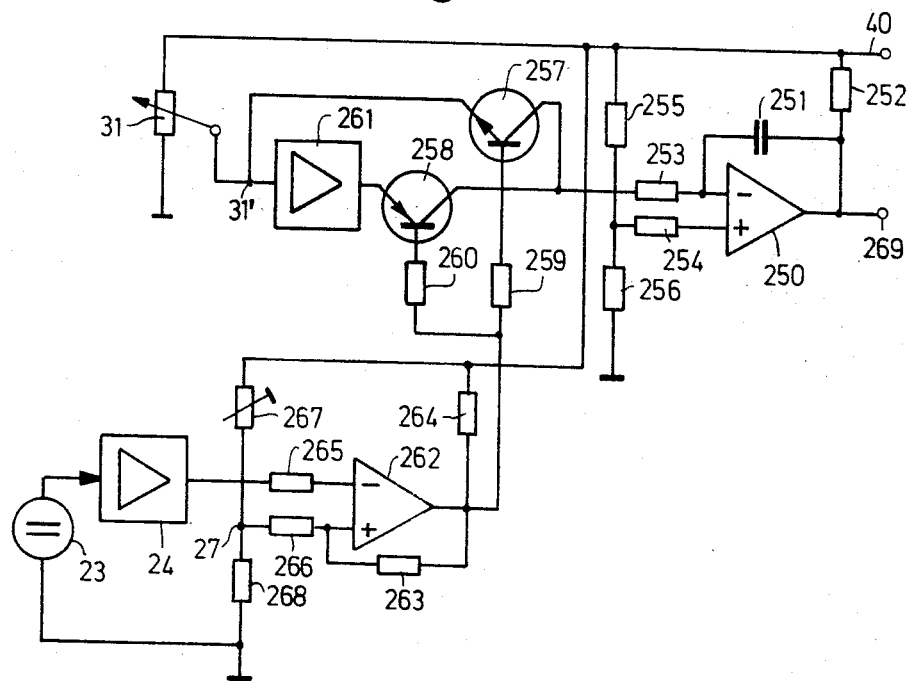
FIG. 3 is a schematic diagram of a portion of the control loop of FIG. 2b.

The details of the control amplifier 25 are illustrated in FIG. 3 and, essentially, includes an integral controller, utilizing an integrating operational amplifier 250. The output of operational amplifier 250 is connected over resistor 252 with positive reference terminal 40. The non-inverting input of the operational amplifier 250 is connected over an input resistor 254 to the tap point of a voltage divider formed of resistors 255, 256. The feedback connection of the operational amplifier 250 includes an integrating condenser 251.

The inverting input of operational amplifier 250 is connected over coupling resistor 253 with the collector electrodes of a pair of transistors 257, 258, the transistors being of opposite conductivity type. The emitter of the npn transistor 257 is connected to the input of an inverting amplifier 261 which, in turn, connects to the emitter of the pnp transistor 258. Further, the input of amplifier 261 and emitter of transistor 257 is connected to the tap point of potentiometer 31 which forms the position transducer for control pedal 30.

The pre-amplifier 24, connected to the output of sensing element 23, is connected over an input transistor 265 to the inverting input of an operational amplifier 262. the non-inverting input is connected over feedback resistor 263 with the output of the operational amplifier and, further, over a coupling condenser to the tap point of a voltage divider formed of resistors 267, 268, of which resistor 267 is adjustable. The operational amplifier 262 functions as a threshold switch, the sensitivity or response threshold of which is adjustable by setting the resistor 267. The tap point between the two resistors 267, 268 forms the input terminal 27 (FIG. 2b) of reference voltage, to provide a command value, adjustable by resistor 267. The output of the operational amplifier 262 is connected over coupling resistor 264 to the positive supply bus 40 and, further, over resistors 259, 260 to the base terminal of the transistors 257, 258, respectively.

Figure 4A:
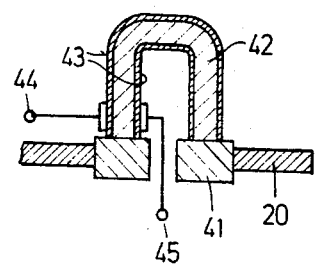
FIG. 4a is a schematic, cross-sectional view of a sensing element.

The oxygen sensor— FIG. 4a — is essentially composed of a closed tube 42 including a sintered solid electrolyte. The tube 42 has a platinum layer 43 with micropores formed therein, the platinum layer being applied, for example, by vapor deposition. The two platinum layers 43 are supplied with electrical terminals which are connected to terminal connections 44, 45. Tube 42 is inserted in a socket 41 and located in the wall 20 of the exhaust gas, or exhaust manifold. Socket 21 is formed with a bore through which ambient outside air can penetrate into the interior of the closed tube 42. The outer surface of tube 42 is exposed to the exhuast gases.

Figure 4B:
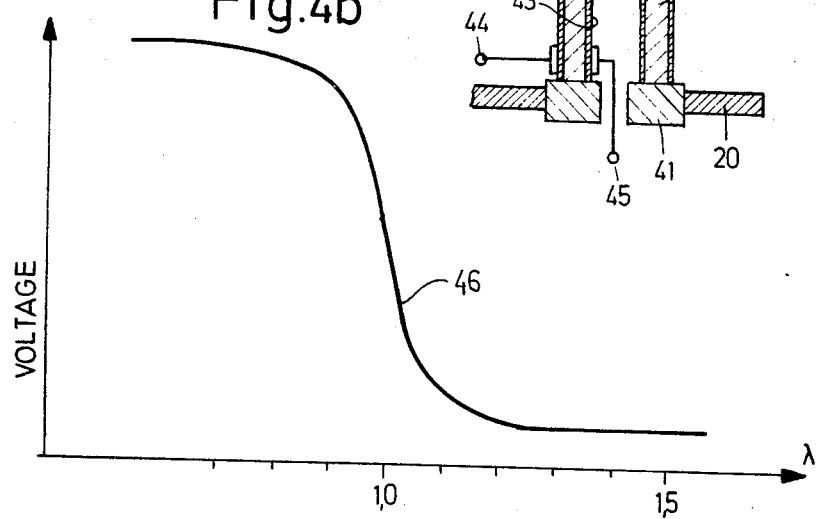

FIG. 4b is drawn with respct to the air number $\lambda$ which has a value of one when a stoichiometric air-fuel mixture is present, and defines the ratio of mass of air to fuel; for perfect combustion of gasoline this ratio is usually in the order of about 14.4 : 1. If the mixture is lean, then the air number $\lambda$ is greater than one; rich mixtures are represented by air numbers less than one.

The output voltage of the sensor 23 is illustrated in FIG. 4 with respect to the air number $\lambda$. The solid electrolyte, at the temperatures usually present in the exhaust stream, is oxygen-conductive. A suitable solid electrolyte may be zircoium dioxide. When the oxygen partial pressure of the exhaust gases departs from the oxygen partial pressure of ambient air, then a voltage difference will arise between the terminals 44, 45. This voltage difference is illustrated, with respect to the air number $\lambda$, by curve 46 in FIG. 4b, and depends, logarithmically, of the quotient of oxygen partial pressure present at both sides of the solid electrolyte 42. The output voltage of the oxygen sensor thus changes rapidly in the vicinity of an air number $\lambda = 1.0$. Above $\lambda = 1.0$, unburned oxygen will be present in the exhaust gases; due to the substantial dependence of output voltage of the sensor from the air number $\lambda$, the oxygen sensor as referred to in FIG. 4a (and see also the cross referenced applications) is particularly suitable to control the system.

Method of controlling exhaust emission, and operation of the system: Catalytic reactor 21 is designed to reduce nitrogen oxide components, primarily NO and $NO_2$. These components can be reduced only when the exhaust gases have a slightly reducing composition. The air number $\lambda$ thus must be controlled at all times to be just below a value of 1.0. As the air number $\lambda$ drops below 1.0, more carbon monoxide and unburned hydrocarbons will be contained in the exhaust gases. It is thus desirable to control the air number to have a value of, for example, 0.98 which is high enough so that only very little unburned hydrocarbons and carbon monoxide are present in the exhaust gas but yet still provides a reducing atmosphere. The thermal reactor which is immediately connected to the outlet valves, and formed essentially by the thermally insulated exhaust manifold 19 serves as an after-burner for unburned hydrocarbons and for carbon monoxide. FIG. 1 illustrates this thermal reactor only schematically. Due to thermal isolation, the wall of the exhaust manifold 19 will reach a temperature of from between about 600° to 800° C, which is sufficient to start afterburning of the combustion gases from the internal combustion engine. It is also possible to utilize a more complicated, separate thermal or thermo reactor for after-burning, without departing from the inventive concept.

The inventive concept may also be used without the catalytic reactor 21 if elimination of nitrogen-oxygen compounds is not required although a higher percentage of nitrogen oxygen compounds will then be present in the total exhaust emitted from the engine.

The system of FIG. 2a changes the bypass throttle 18, used here instead of a separate bypass valve. The base position of throttle 18 is determined by the position of throttle shaft 34, the position of which is transmitted over the one-way clutch 38. If throttle 14 changes, for example in opening direction, bypass throttle blade 18 is turned over the one-way clutch, likewise, to an opening direction. In certain installations, the one-way transmission 38 may be combined with a step-down gearing, or a step-down lever arrangement, so that the bypass flap 18 rotates over a smaller angle than the valve 14. The positioning motor 35 does not rotate upon change of position of the bypass valve 18, since the slip clutch 37 well merely run free.

If the oxygen sensor 23 provides an output signal which indicates a deviation from the air number $\lambda = 0.98$, then the servo amplifier 39 (FIG. 2b) will become energized to energize motor 35 to rotate in the appropriate direction. The slip clutch 37 will transmit rotation from the rotor 35 to the shaft 29 and hence to the bypass throttle 18. The main throttle 14 does not, however, change its position since the one-way clutch 38 will not transmit rotary movement from shaft 29 to the throttle shaft 34.

Servo amplifier 39 is a power amplifier which is so connected that its output provides a positive supply voltage for the motor 35 when the output voltage of control amplifier 25 is more positive than the voltage supplied from the position sensor 36. Such positive output voltage of the servo amplifier 39 causes the motor 35 to turn to the left (FIG 2b), which rotary motion will continue until the output voltage of the angular position transducer 36 will match the value of the output voltage of the control amplifier 25, so that the error signal becomes zero, in accordance with well known servo techniques. At that condition, servo amplifier 39 will no longer supply power to motor 35 and motor 35 will stop. If the output voltage of the control amplifier 25 has a value which is negative with respect to the voltage of the position transducer 36, then a negative supply voltage will be applied to the motor which will then turn towards the right until the voltages again balance.

Let it be assumed that the bypass valve 18, due to a base postion of the clutch 38, has turned too far. Under this condition, the air number $\lambda$ will become too great and the oxygen sensor 23 will provide a low output voltage which is pre-amplifier 24. The output voltage supplied by pre-amplifier 24 is less than the voltage at terminal 27 (FIG. 2b; FIG. 3). The threshold switch formed of operational amplifier 262 and feedback resistor 263 will provide an output voltage which will be close to that of the positive bus 40, which output voltage will be applied over resistor 259 to transistor 257 which will become conductive. The positive output voltage of potentiometer 31, which is the position transducer for the accelerator pedal 30, is applied to the intput of operational amplifier 250. Integrator 250, 251 integrates in negative direction, and the servo amplifier 39 will provide a negative supply voltage to the positioning motor 35 so that it will then turn to the right. This rotation to the right changes the position of the bypass throttle 18 (FIG. 2a) in such a direction that only a smaller cross section will be available in bypass tube 17 for air to pass therethrough.

Whn the bypass throttle 18 has been sufficiently displaced, so that the additional air stream has decreased, the air number $\lambda$ will drop and reach, for example, the value 0.98. At that position, the oxygen sensor 23 provides a sharply higher output voltage. The output voltage at the pre-amplifier 24 will exceed the voltage at terminal 27 (FIG. 2b, FIG. 3) so that the output of operational amplifier 262 will jump to negative, or chassis voltage. This negative voltage will block the previously conductive transistor 257 and open the previously blocked transistor 258. The inverter amplifier 261 provides an inversion, that is, an amplification of $v = -1$ and, thus, provides inverted output voltage proportional to the voltage at the tap point of the position transducer 31. The inverting input of the operational amplifier now has negative input voltage applied thereto, depending on the position of the accelerator pedal 30. The operational amplifier 250 will integrate in positive direction and the servo amplifier 39 provides an output voltage causing rotation of motor 35 to the left, to cause opening of the bypass valve 18.

As seen from the above, the output voltage of the oxygen sensor 23 controls the threshold switch (operational amplifier 262 with its feedback resistor 263) only to set the direction into which the output voltage of integrator 250, 251 will slowly change. The output voltage of the position transducer 21 determines the speed with which the output voltage of integrator 250, 251 changes. If the main throttle 14 is wide open, high positive or negative input will be applied to integrator 250, 251, so that the output voltage of the operational amplifier 250 will change rapidly in negative or positive direction, respectively. This shift is much slower when the throttle 14 is only slightly open, so that the input voltage applied to the inverting input of the operational amplifier is low. The object of the control system, above referred to, is thus achieved: When a large quantity of air passes through the inlet manifold, that is, when the main throttle 14 is wide open, the bypass throttle 18 changes position rapidly. The relative change in the quantity of air passing therethrough in a predetermined time interval, and thus the air number $\lambda$ is kept constant for all possible positions of the main throttle 14.

The control loop is stable under all operating conditions since the time delay is matched to the air flow. It would be theoretically possible to utilize a proportional controller rather than the integral controller 250, 251, which has a very low delay time in comparison to the time delay of an integral controller. This, however, is undesirable for two reasons: First, the integral controller will effectively compensate for remaining control deviations, for example due to drift, aging of the sensor and subsequent changes in output voltages of the sensor, and the like; and further, since the output curve 46 in the region of the air number $\lambda = 1.0$ is very steep, a proportional controller might change the bypass throttle rapidly either too far, or to effect closing of the bypass throttle 18 too much.

The base position of the bypass valve 18 can be changed mechanically, as illustrated in connection with FIGS. 2 and 3. The output voltage of the oxygen sensor 23 determines the direction into which the bypass throttle 18 is to be changed; the operating speed is determined by the main throttle position 14. Under certain conditions it is desirable to change the operating speed not based on main throttle position but rather in accordance with engine speed. The circuit of FIG. 3 can easily be modified if, instead of the position transducer 31 being connected to inverting amplifier 261 and to the transistor 257 (FIG. 3), a digital d-c analog converter such as the frequency-analog signal converter 33 is connected to terminal 31' (FIG. 3). It is of course also possible to change the positioning speed of the bypass throttle 18 in dependence on both the main throttle position 14 (that is, of the control pedal 30) and the motor speed as well. In this instance, the terminal 31 will have a summing circuit applied thereto as illustrated, for example, in FIG. 3, which includes summing resistors 50, 51, 52 and an operational amplifier 53 with a feedback resistor 54. By suitable selection and dimensioning of the summing resistances corresponding to resistors 50, 51, 52, and to which position transducer 31 and the frequency-analog signal converter is connected, the operating speed of the bypass throttle 18 can be changed in accordance with desired relationships of the input values affecting the position of the bypass throttle. Changing the value of resistance of the trimmer resistor 267 changes the threshold value of the air number $\lambda$ which, in the above described example, is set to a value of 0.98.

The system of FIG. 2a, can likewise be changed by eliminating the mechanical base position of the bypass valve 18 over the one-way clutch 38, since the base position can equally be controlled electrically. In this instance, the servo amplifier 39 has control voltages applied thereto which include the output voltage of the control amplifier 25, the position transducer 31, and the frequency-analog signal converter 25, if desired. Such an electrical system for basically setting the bypass valve 18 in dependence on the position of the main valve 14 is described in more detail in FIG. 5; for correspondence, it is only necessary to utilize a servo amplifier 39 rather than the operational amplifier 53, in the output, as illustrated and described in accordance with FIG. 5.

Figure 5:
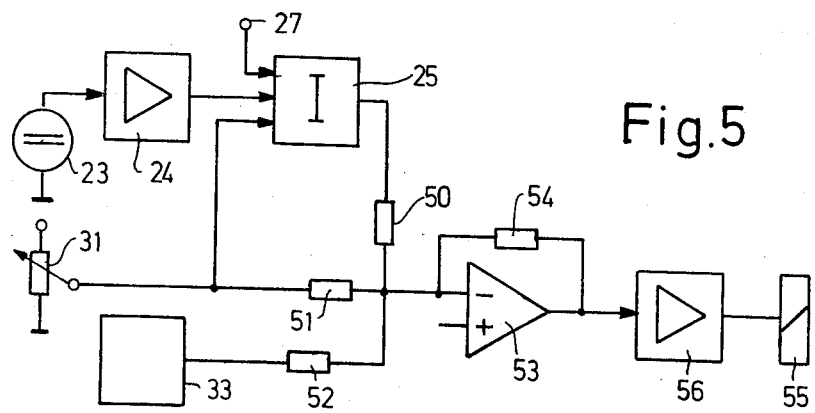
FIG. 5 is a block diagram of a different embodiment of the control loop.

A modified control circuit is illustrated in FIG. 5 to carry out the method of the present invention. The control amplifier 25 has an input terminal 27, to which a command value is applied. A second input of control amplifier 25 is connected to the output of pre-amplifier 24. The third input of control amplifier 25 has the output of the position transducer 31 applied thereto. The output of the control system of FIG. 5 is applied to a magnet or solenoid coil 55 which controls a valve position. An operational amplifier 53, with a feedback resistor 54, has an inverting power amplifier 56 connected to its output, to drive the solenoid coil 55. The operational amplifier 53 operates as a proportional amplifier; its non-inverting input is connected to a reference potential, for example to the tap point of a voltage divider, not shown. The inverting input of the operational amplifier is connected to three adding resistors 50, 51, 52 which, respectively, have the output voltages of control amplifier 25, position transducer 31, and the frequency-analog signal converter 33 applied thereto.

Figure 6:
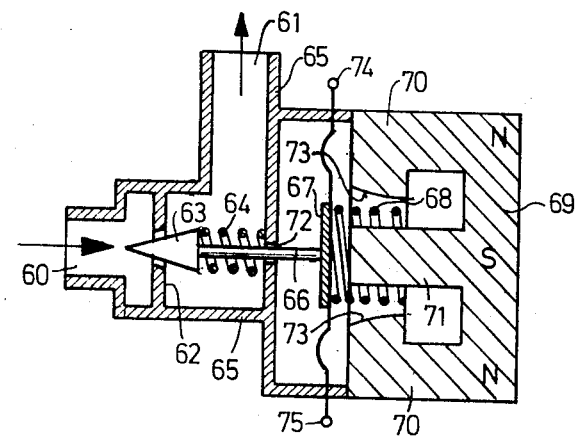
Figure 7:
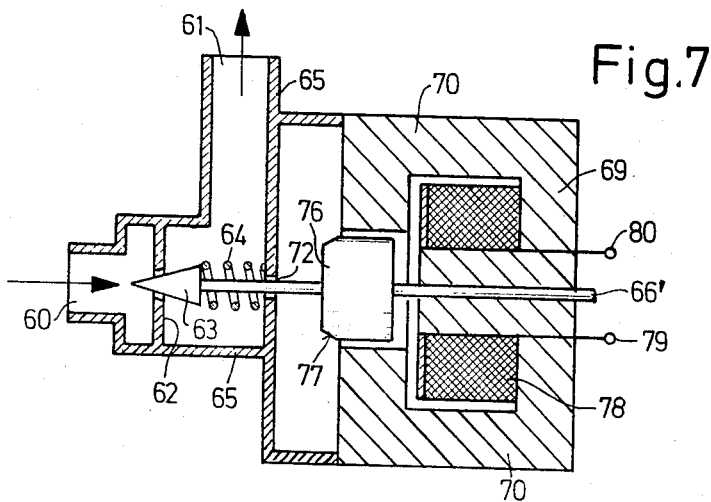

FIGS. 6, 7, and 8 show various embodiments of bypass valves which can be controlled by the circuit of FIG. 5, and which have magnetic coils corresponding, in operation, to the load coil 55 of FIG. 5.

In accordance with FIG. 6, an inlet opening 60 is connected over valve seat 62 to an outlet opening 61; the valve seat 62 can be proportionately opened or closed by a valve cone 63 which is guided by means of rod 66 in a bore 72 of the valve housing 65. Cone 63 is spring-loaded by a spring 64. A cup-shaped magnet 69, which is a permanent magnet, is attached to housing 65. The cup magnet has a cylindrical south pole 71 and a ring-shaped north pole 70, circumferentially surrounding south pole 71. North pole 70 has one of its faces profiled, as seen at 73, for example by removing of metal on a lathe, so that the air gap of the magnet 69 has a non-linear characteristic. coil 68 enters into the air gap, the coil being secured to a base plate 67 attached to guide rod 66. Coil 68 is supplied with current over two pigtails brought out to terminal 74, 75.

The bypass valve of FIG. 7 has a similar air control section to that of FIG. 6; it differs in the electromagnetic structure. The cup-shaped magnet is an electromagnet which is energized coil 78, wound on the cylindrical pole extension of magnet 70. A pair of supply terminals 79, 80 connect to coil 78. The guide rod 66' is longer than guide rod 66 (FIG. 6) and extends into a cylindrical bore within the center portion of the magnet 70. An armature 76 is connected to the guide rod 66 between the valve housing 65 and the cylindrical center pole of the magnet. The armature 76 has a facet 77 removed, so that the air gap between the ring-shaped magnetic pole 70 and the armature 76, upon movement of the armature 76 into the air gap, will be somewhat non-linear.

Figure 8A:
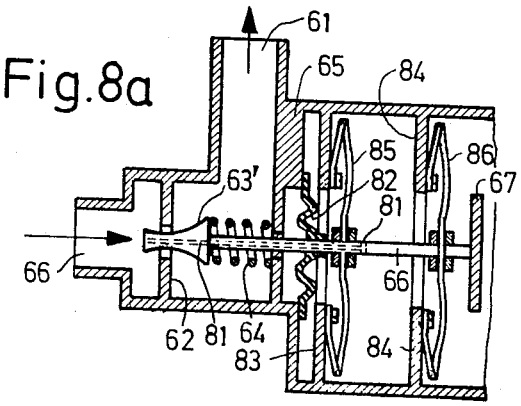
Figure 8B:
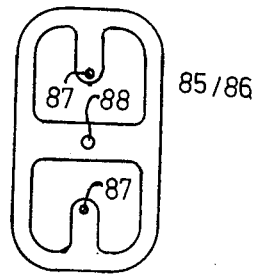

The bypass valve of FIG. 8a has a valve structure which is similar to that previously described with the exception, however, that the valve cone 63 has a non-linear contour so that the air stream passing through the valve seat 62, when the valve cone is lifted off the seat 62, will be non-linear with respect to travel of the cone 63'. Only small mechanical forces are necessary to deflect the valve cone 63 of the valve of FIG. 8a. The guide rod 66, therefore, is not retained in friction bearings but rather is held by means of a pair of leaf springs 85, 86 (FIG. 8b) which are connected directly to projections 83, 84 of the valve housing 65. Holes 87 in leaf springs 85, 86 connect the leaf springs to the projections 83, 84; the central opening 88 accepts the central guide rod 66. The sring, as best seen in FIG. 8b, has a high degree of stiffness in radial direction but can readily deflect in axial direction, where its stiffness is low. Thus, only very small positioning forces are necessary to move the guide rod 66, and with it cone 63', in longitudinal direction.

The space between the valve seat 62 and the outlet opening 61 is sealed by a membrane 82, so that the electromagnetic structure is sealed with respect to the pneumatic structure of the valve. The membrane 82 is connected in gastight relation to the guide rod 66 and to the housing 65 of the valve. A central bore 81 interconnects the air spaces between the magnet and the valve, to provide for pressure equalization. The pressure equalization permits use of even smaller positioning forces; yet, the flow resistance of a long, very thin bore 81 is so high that oscillations of the mechanical system formed by the guide rod 66 and the pressure spring 64 are well damped.

The electromagnetic structure of the valve of FIG. 8a is not shown, since either structure above discussed in connection with FIG. 6 or FIG. 7, or equivalent and alternative structures can be used.

Operation of system of FIG. 5 in connection with valves of FIGS. 6 to 8: The bypass valves, FIGS. 6–8, are opened wider when the control current derived from the circuit of FIG. 5 increases, that is, when the current applied to terminals 74 or 79, 80, respectively, increases. The base position of the bypass valve is obtained electrically, not by mechanical means as described in connection with the example of FIGS. 1–3. The output voltages of the position transducer 31, the frequency-analog transducer 33 and the sensor are all applied to the operational amplifier 53 and the power amplifier 56. The output voltage of converter 33 increases with output frequency of the pulse source 32, that is, with speed of the internal combustion engine. The output voltage of the position transducer 31 increases with increasing opening of the main throttle valve 14 (FIG. 1). Since the operational amplifier 53 is controlled by the inverting input, and power amplifier 56 is likewise inverting, the current applied to the magnetic coil 55 (corresponding to coil 68 — FIG. 6 or 78 — FIG. 7) will increase with increasing input voltage of the operational amplifier 53.

As described in connection with the first example, the base position of the main valve 14, as determined by the position transducer 31, influences the position of the bypass throttle 18. Further, the speed of the internal combustion engine is used as an additional factor to change the base position. Thus, the base position of the bypass valve is matched well to the actual air mass passing through the main air path into the intake manifold 12'. This base position is added to the additional control determined by the output signal of the control amplifier 25.

Operation: Let it be assumed, to illustrate a specific control cycle, that bypass valve 18 has been opened too far, due to control from the base position. This causes an increase in the air number λ which will go beyond the set value, and the oxygen sensor will supply a low output voltage (see FIG. 4b). As described in connection with the circuit of FIG. 3, operational amplifier 250 will integrate in negative direction. The input voltage of the operational amplifier 53 is thereby decreased, due to the application of this decreasing value over summing resistor 50, and excitation current for the magnet winding 55 (that is, for coils 68, 78) will decrease. Bypass valve 18 will close more; it will continue to close until air number λ has decreased to the point at which the output voltage of the oxygen sensor 23 exceeds the threshold limit of the threshold switch formed by operational amplifier 262, 263 and, upon response of operational amplifier 262, 263, integration will then proceed in opposite direction. Change-over of the threshold switch 262, 263 indicates that the air-fuel mixture has become too rich, and excitation current to the magnetic winding is increased to permit the valve to open more.

The actual control cycle is thus similar to that of the initially described example. The difference essentially resides in the fact that the base position is electrically obtained. By suitable choice of the relative values of the adding resistors 50, 51, 52, it is possible to change the control excursion and control limit of e operational amplifier 53, and hence of the power amplifier 56. The contours or profiles 73 (FIG. 6) and 77 (FIG. 7) or the shape of the cone 63' (FIG. 8a) can be utilized additionally to compensate for non-linearities in the control loop.

Figure 9:
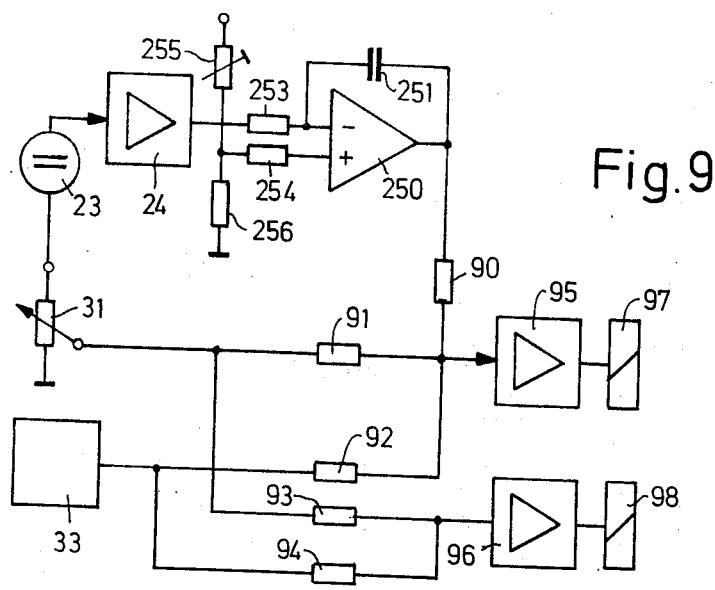
FIG. 9 is a schematic diagram of another form of the control loop.

A further embodiment illustrated in FIG. 9. The requirement for electrical components of the system of FIG. 9 is less than that of the previous systems, however, the mechanical requirement for components is increased. Both bypass valves of FIGS. 6, 7, can be combined, by connecting a coil 68 mechanically with the pin or rod 66 and forming, additionally, the magnet in which the coil operates as an electromagnet with its own magnetic winding 78. The connection of such a system is illustrated in FIG. 9, where the movable coil is schematically indicated at 97 and the excitation winding for the magnet at 98. Both windings 97, 98 have power amplifiers 95, 96, respectively, connected thereto. The position transducer 31 and the speed-analog converter 33 are connected over adding resistors 91 to 94 with the inputs of the two power amplifiers 95, 96. The output of control amplifier 25 is further connected over an additional adding resistor 90 to the input of the power amplifier 95. In this form of the invention, the control loop of the control amplifier 25 is an integral controller without contol of the time constant thereof. The oxygen sensor 23 again has pre-amplifier 24 connected thereto which, in this instance, is an inverting-type amplifier, to provide a signal polarity reversal. An operational amplifier 250 is used as integral controller, as in the first example in accordance with FIG 3, connected with an integrating capacitor 251 in its feedback path. The noninverting input is connected to a source of control voltage formed by the tap point of voltage divider resistors 255, 256, resistor 255 being adjustable. The tap point is connected over coupling resistor 254 and the output of inverting-type pre-amplifying amplifier 24 is connected over a coupling resistor 253.

The basic position of the bypass valve 18 changes with the position of the main valve 14 (FIG. 1), as in the second example, under electric control. The output voltages of the position transducer 31 and of the frequency-direct current analog converter 33 are added at the inputs of the two power amplifiers 95, 96, so that the base position is applied as a positioning value both to the movable coil 97 as well as to the excitation winding 98. By suitable choice of the resistances of the adding resistors 91 to 94, any desired non-linear function or relationship may be commanded, so that non-linearities in the control loop can be corrected. The additional change in positon, depending on output gas composition is obtained by applying a signal over adder resistor 90 which nfluences only the movable coil 97. In operation, the control system operates as in the previously discussed example. When the air number λ is too great, oxygen sensor 23 provides a low voltage which is amplified in the pre-amplifier 24 to provide, due to its inverting characteristic, a high output voltage. Integrator 250, 251 thus integrates in negative direction. The coil 97 has less current applied thereto from amplifier 95 and bypass valve 18 will move in closing direction.

The control amplifier of FIG. 9 may be similar to that of FIG. 3, which will additionally cause the positioning speed of the bypass valve 18 to be controlled. It is also possible to control the output of amplifier 25 to the power amplifier 96 rather than to amplifier 95, as shown.

Figure 10:
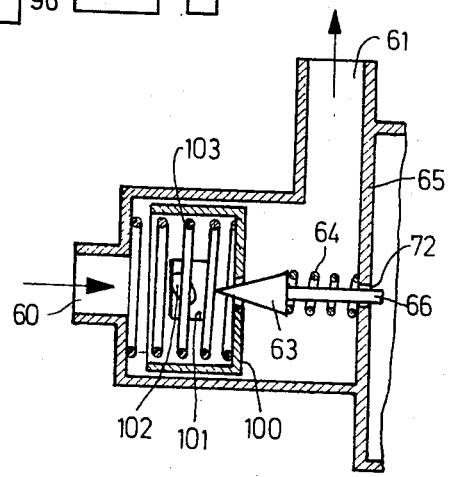
FIG. 10 is a fragmentary cross-sectional view of another embodiment of a bypass valve.

FIG. 10 illustrates a further embodiment of a bypass valve which, as in FIGS. 6 to 8, has an inlet opening and an outlet opening 61. The valve cone 63 is guided over rod 66 in a bore 72 of housing 65, and biassed to closing position by means of a spring 64. The bypass valve of FIG. 10, similar to the bypass disk valve 18 of FIG. 2a, has a mechanical input to influence its base position. This mechanical input is a movable valve seat 100, movably retained within the valve housing. Valve seat 100 is formed with a lateral opening 101, in which a cam 102 may move, to shift the position of valve seat 100 left to right — referring to FIG. 10 — depending on position of the cam. The valve seat itself is biassed towards the right by spring 103, which is located between valve seat 100 and housing 65.

Cam 102 is mechanically connected with the throttle shaft 34 (FIG. 2a). Upon movement of the throttle shaft 34, valve seat 100 will move. By suitable shaping of the cam 102, or of the opening 101, or both, non-linear relationships between base position of the main throttle valve 14 and of the bypass valve can be obtained. The valve cone 63 may be shaped with a contour which is non-linear, for example similar to that of valve cone 63' (FIG. 8a). Thus, by simple mechanical shaping, non-linearities in the control loop can be compensated. The pin 66 can be controlled in position as discussed in connection with the embodiments of FIGS. 6 or 7, by means of a coil, an armature, by both or, separately, as discussed in connection with FIG. 9.

The method in accordance with the present invention thus provides control of bypass air to an internal combustion engine which depends on both the position of the main throttle valve, as well as other operating parameters of the engine that is, in this example, primarily exhaust gas composition and engine speed. Other parameters can be utilized to affect valve position, by connecting further summing resistors to the control circuits, similar to resistors 90, and 91–94 (FIG. 9) or 50, 51, 52 (FIG. 5), for example. The base position of the main throttle valve 14 thus controls the opening of the bypass valve 18, and this setting is further matched to the speed of the internal combustion engine 11. At any air flow, the relative change of the air number λ will thus change in dependence on the output signal of the oxygen sensor 23. Both the control limits, that is, the control range and the delay time of the control amplfier 25 can be matched to the air flow to the engine. Thus, rapid changes in operating conditions of the internal combustion engines can be followed, so that, upon fast, large changes, the control amplifier will respond rapidly.

Various changes and modifications may be made within the inventive concept.

We claim:
1. Method to remove polluting components from the exhaust gases of internal combustion engines comprising
   applying an air-fuel mixture to the inlet manifold (12') of the engine (11) over a first path (13);
   controlling (14) the relative proportion of air and fuel in the air-fuel mixture being admitted through said first path, in accordance with a commanded input (30);
   measuring the oxygen content (23) of the exhaust gases from the engine;
   applying air to the inlet manifold (12') of the engine (11) over a second path (17);
   and controlling (18) the amount of air being admitted through the second path in accordance with
   a. the amount of air being admitted through the first path and, additionally,
   b. the measured oxygen content of the exhaust gases.

2. Method according to claim 1 wherein the step of controlling the amount of air being admitted through the first path (13) comprises
   setting a throttle valve (14) in the main air duct in accordance with a commanded position;
   and the step of controlling the amount of air being admitted through the second path (17) comprises
providing an auxiliary air inlet duct (17), in shunt with the main air duct (14) and having an auxiliry valve (18);

and controlling the position of the auxiliary valve (18) in accordance with the position of the main throttle valve (14) as modified by the measured oxygen content of the exhaust gases.

3. Method according to claim 1, wherein the step of controlling the amount of air being admitted through the second path comprises additionally controlling the amount of air being admitted as a function of engine speed.

4. Method according to claim 1, wherein a control amplifier (25) is provided, and electrically controlled air flow means are provided in said second path, the output of the control amplifier controlling the air flow control means in the second path to effect the step of controlling the amount of air flowing through the second path;

and wherein the range of output of the control amplifier (25) is controlled by at least one of the parameters: engine speed; air flow in the first path.

5. Method according to claim 4, wherein the control amplifier (25) has a variable delay time;

and the delay between control input to the control amplifier and the control output thereof is varied in accordance with at least one of the parameters: engine speed; air flow in the first path.

6. Method according to claim 1, wherein the air flow in the second path (17) is controlled such that the relationship of air mass to fuel being supplied at the inlet manifold (12') to the engine is just below the stoichiometric ratio and has a value of about 0.98.

7. Method according to claim 5, comprising the step of after-burning unburned carbon monoxide and hydrocarbons in a thermo reactor (19, 20), and then reducing nitrogen-oxygen compounds in a catalytic reactor (21) following the thermo reactor.

8. Internal combustion engine exhaust emission cleaning system, in which the internal combustion engine (11) has an inlet manifold (12'), means (15) introducing fuel into the inlet manifold;
means (14) controlling the flow of air in the inlet manifold in a first path;
means (17) introducing additional air into the inlet manifold in a second path;
means (18) controlling the flow of additional air into the inlet manifold through an additional air path;
exhaust gas analysis means (23) measuring the oxygen content of the exhaust gases and deriving an electrical sensing signal;
and electromechanical control means connected to and controlling the flow control means for the additional air, the electromechanical control means having an input which is responsive to the amount of air flowing in the first path and further to said electrical sensing signal to control the flow of additional air as a function of the flow of air in the first path as well as a function of a predetermined relationship of oxygen in the exhaust gas as sensed by said exhaust gas analysis means (23).

9. System according to claim 8, wherein the internal combustion engine has a settable control (30) including means (31) deriving a signal representative of the position of said control and applying said signal to the electromechanical control means in a direction to increase response time of said control means when the settable control is set for high power operation of the engine providing for high air flow through said first path.

10. System according to claim 8, wherein the means controlling the flow of air in the first path comprises
a main throttle valve (14) having a shaft (34);
the flow control means for the additional air path comprise an additional throttle valve (18) having an additional shaft (29);
and the electro-mechanical control means comprises mechanical means (38, 100) responsive to throttle shaft (34) deflection connected to operate the additional throttle shaft (29) and additional electrical input position-output electrical signal transducer means (35) responsive to the electrical sensing signal additionally deflecting the additional throttle valve (18).

11. System according to claim 10, wherein the mechanical means comprises
a bi-directional one-way clutch (38) connected at the driven side with the main throttle shaft (34) and at the driving side to the additional throttle shaft (29) to transmit rotary movement from the throttle shaft, in both rotary directions, to the additional throttle shaft (29) but not to transmit rotary movement in either rotational direction from the additional throttle shaft (29) to the main throttle shaft (34); and the electrical input-position output transducer comprises
a synchro motor (35) and a slip coupling (37) connecting the synchro motor to the additional throttle shaft (29) to permit setting of the additional throttle (18) upon change in position of the main throttle shaft (34) and modifying this position under control of the operation of the synchro motor.

12. System according to claim 11, further comprising a closed servo loop (35, 36–39) including a position transducer (36) coupled to the output shaft of the synchro motor (35).

13. System according to claim 12, wherein the servo loop includes a servo amplifier (39) controlling the amount and direction of rotation of the synchro motor (35);
and means including a reference source (40) connected to the position transducer, the output from the position transducer forming a comparison input to the servo amplifier (39).

14. System according to claim 13, wherein the electro-mechanical control means comprises
a control amplifier (25) having an output connected to and controlling the servo amplifier (39);
a source of command signals representative of commanded fuel-air ratio, said control amplifier having one input connected to said command source and another input connected to the output of the gas analysis means.

15. System according to claim 12, further comprising a position transducer (31) coupled to the main throttle shaft (34) to provide a signal representative of main throttle shaft deflection.

16. System according to claim 14, further comprising a position transducer (31) coupled to the main control shaft (34) to provide a signal representatve of main throttle shaft deflection;
said control amplifier having a third input connected to the output of the position transducer (31).

17. System according to claim 14, wherein the control amplifier is an integrating amplifier.

18. System according to claim 17, wherein the integrating amplifier (25) includes an operational amplifier (250) having an output and an inverting input;
and an integrating capacitor (251) connected between the output and the inverting input.

19. System according to claim 18, (FIG. 9), wherein the gas analysis means (23) is interconnected with the inverting input of the operational amplifier (250).

20. System according to claim 18, further comprising a position transducer (31) coupled to the main throttle shaft (34) to provide a signal representative of main throttle shaft deflection;
a first transistor (257) interconnecting the output of the position transducer (31) and the inverting input of the operational amplifier (250);
a series connection formed of an inverting amplifier (261) and a second transistor (258) connected in parallel to the first transistor;
said transistors being of opposite conductivity types.

21. System according to claim 20, further comprising a threshold switch (262, 263) connected to the gas analysis means (23), the output of the threshold switch being connected to the base electrodes of the first and second transistors (257, 258).

22. System according to claim 21, wherein the threshold switch comprises an operational amplifier (262) having a resistor (263) in the feedback circuit from the output to the non-inverting input thereof.

23. System according to claim 8, wherein the means (18) connecting the flow of additional air comprises
a bypass valve having an electro-mechanical positionable valve cone (63) and a mechanically movable valve seat (100);
and drive means (102) operatively interconnecting the means controlling flow of air in the first path and the mechanically movable valve seat to move the valve seat in accordance with change in position of said flow control means.

24. System according to claim 23, wherein the flow control means for the first path comprises
a throttle and a throttle shaft and the drive means comprises a cam (102) interconnected with the throttle shaft.

25. System according to claim 8, wherein the electro-mechanical control means comprises a common electro-magnetic means responsive both to the amount of air flowing in the first path and further to said electrical sensing signal.

26. System according to claim 25, wherein the electro-mechanical means comprises control amplifier means and an electro-magnetic valve;
said valve forming the means controlling the flow of additional air and comprising a valve seat (62);
a valve cone (63, 63') movable with respect to the valve seat;
magnet means (69) having an air gap;
and a coil adapted to move with respect to the air gap secured to the valve cone, and connected to said control amplifier means.

27. System according to claim 26, wherein the air gap has an axially non-linear cross section.

28. System according to claim 25, wherein the electro-mechanical means comprises control amplifier means and an electromagnetic valve;
said valve forming the means controlling the flow of additional air and comprising
a valve seat (62); a valve cone (63) movable with respect to the valve seat;
electro-magnetic means having an air gap;
an energizing coil (78) for said electromagnetic means;
and an armature adapted to move with respect to the air gap secured to the valve cone (63), the energzing coil being connected to said control amplifier.

29. System according to claim 28, wherein the air gap is toroidal and has an axially non-linear cross section.

30. System according to claim 25, wherein the electro-mechanical means comprises a control amplifier means and an electro-magnetic valve, said valve forming the means controlling the flow of additional air and comprising
a valve seat (62);
a valve cone (63) movable with respect to the valve seat;
electro-magnetic means controlling the movement of the valve cone and being connected to said control amplifier means.

31. System according to claim 30, wherein the valve cone (63) has a non-linear side contour to provide a non-linear characteristic of displacement with respect to flow through the valve.

32. System according to claim 30, comprising a guide rod (66) guiding the movement of the valve cone (63);
a pair of leaf springs (85, 86) securing the guide rod in position in the electro-magnetic valve free from sliding friction.

33. System according to claim 30, wherein the electro-magnetic valve has a magnet assembly (69);
a membrane (82) is located to seal the space between the magnet assembly (69) and the valve seat (62), the membrane being connected with the means moving the valve cone by gas-tight connection;
and a pressure equalization opening bridging the membrane.

34. System according to claim 33, wherein a guide rod (66) is provided secured to the valve cone and guiding the movement of the valve cone (63) of the electro-magnetic valve;
and wherein the pressure equalization opening comprises a central bore (81) in the guide rod bridging the region of the membrane and connecting both sides of the membrane (82), the flow resistance of said bore bridging the opening being high with respect to the flow resistance of the valve.

35. System according to claim 26, wherein the control amplifier means comprises a control amplifier (25) and a power amplifier (63) connected to the output of the control amplifier;
the control amplifier being connected to the gas analysis means and providing a signal representative of oxygen content in the exhaust gas to the power amplifier;
and additional signal input means are provided connected to at least one of said amplifiers.

36. System according to claim 35, comprising transducer means (31) connected to the internal combustion engine and providing an engine control output signal representative of engine controller position.

37. System according to claim 35, further comprising speed transducer means (32, 33) connected to the internal combustion engine (11) and providing a speed output signal representative of engine speed.

38. System according to claim 36, wherein the additional input signal means is connected to the engine control output signal.

39. System according to claim 36, wherein the additional signal input means is connected to the speed output signal.

40. System according to claim 36, wherein the control amplifier (25) has two additional inputs, one additional input being connected to a command source (27) representative of a commanded air-fuel relationship ($\lambda$);

transducer means (31) are provided connected to the internal combustion engine and providing an engine control output signal representative of engine controller position, the engine control output signal being connected to the other additional input.

41. System according to claim 8, wherein the electromechanical control means comprises a common electro-magnetic means responsive both to the amount of air flowing in the first path and further of said electrical sensing signal, said electro-magnetic means including
control amplifier means and an electro-magnetic valve, said valve forming the means controlling the flow of air;
said valve comprising a valve seat (62) and a valve cone (63) movable with respect to the valve seat;
cup-shaped magnetic means (69) having a toroidal air gap, and coil means (97) movable within the air gap;
an operating rod (66) connected to said coil means, the magnetic means being an electromagnet having an energizing coil (98), said energizing coil and the movable coil being controlled by said control amplifier means.

42. Systm according to claim 41, comprising a pair of power amplifiers (95, 96), one power amplifier each being connected to the movable coil and to said magnet coil;
and control circuit means controlling said power amplifiers forming said control amplifier means and comprising summing circuit means (90, 91, 92) applying electrical voltages representative of said electrical sensing signal (23, 24) and of operating parameters (31; 32, 33) of the engine applied to one power amplifier and adding resistors (93, 94) being connected to the other power amplifier and having signals representative of operating parameters of the engine (31; 32, 33) applied thereto.

43. System according to claim 42, wherein the signals representative of operating parameters of the engine comprise signals representative of at least one of: commanded engine controller position; engine speed.

44. System according to claim 8, wherein the exhaust gas analysis means comprises
an oxygen sensor (23) including an oxygen ion conductive solid eletrolyte and providing two surfaces, one surface being exposed to the exhaust gases from the engine and the other surface being exposed to ambient air;
the surfaces having microporous platinum layers (43) applied thereto;
and contact means contacting the two platinum layers at the two sides of the solid electrolyte.

45. System according to claim 44, wherein the oxygen ion conductive solid electrolyte comprises zirconium dioxide.

* * * * *

UNITED STATES PATENT OFFICE
CERTIFICATE OF CORRECTION

Patent No. 3,759,232      Dated September 18, 1973

Inventor(s) Josef WAHL et al (Josef WAHL and Peter Jürgen SCHMIDT)

It is certified that error appears in the above-identified patent and that said Letters Patent are hereby corrected as shown below:

1. Col. 1, line 16, change "are" to --is--
2. Claim 8, col. 13, line 47, change "a second" to --an additional--
3. Claim 8, col. 13, line 49, change "an" to --the--.

Signed and sealed this 2nd day of April 1974.

(SEAL)
Attest:

EDWARD M. FLETCHER, JR.
Attesting Officer

C. MARSHALL DANN
Commissioner of Patents